(12) United States Patent
Suzaki et al.

(10) Patent No.: US 9,108,684 B2
(45) Date of Patent: Aug. 18, 2015

(54) ROCKER END PORTION STRUCTURE

(75) Inventors: Takahiro Suzaki, Toyota (JP);
Shunsuke Niitani, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/699,393

(22) PCT Filed: Sep. 5, 2011

(86) PCT No.: PCT/JP2011/070192
§ 371 (c)(1),
(2), (4) Date: Nov. 21, 2012

(87) PCT Pub. No.: WO2013/035151
PCT Pub. Date: Mar. 14, 2013

(65) Prior Publication Data
US 2013/0207418 A1    Aug. 15, 2013

(51) Int. Cl.
*B62D 25/20*    (2006.01)
*B62D 25/02*    (2006.01)
*B62D 21/15*    (2006.01)

(52) U.S. Cl.
CPC ............. *B62D 25/20* (2013.01); *B62D 25/025* (2013.01); *B62D 25/2036* (2013.01); *B62D 21/152* (2013.01); *B62D 25/2018* (2013.01)

(58) Field of Classification Search
CPC ...... B62D 21/02; B62D 21/15; B62D 21/152; B62D 25/025; B62D 25/20; B62D 25/2009; B62D 25/2018; B62D 25/2036
USPC ............. 296/187.03, 187.08, 187.09, 187.12, 296/193.07, 193.09, 203.02, 204, 205, 209
See application file for complete search history.

(56) References Cited

U.S. PATENT DOCUMENTS

| | | | | |
|---|---|---|---|---|
| 4,471,992 | A * | 9/1984 | Matsuura et al. | 296/209 |
| 6,761,394 | B2 * | 7/2004 | Gennai et al. | 296/203.01 |
| 8,585,129 | B2 * | 11/2013 | Mori | 296/187.09 |
| 2010/0066125 | A1 | 3/2010 | Egawa et al. | |
| 2010/0231002 | A1 * | 9/2010 | Yoshioka et al. | 296/187.12 |
| 2010/0270830 | A1 * | 10/2010 | Maruyama | 296/209 |

FOREIGN PATENT DOCUMENTS

| | | | |
|---|---|---|---|
| JP | 9-315344 | A | 12/1997 |
| JP | 2001-138956 | A | 5/2001 |
| JP | 2007-203893 | A | 8/2007 |
| JP | 2007-230268 | A | 9/2007 |
| JP | 2008-265536 | A | 11/2008 |
| JP | 2009-113766 | A | 5/2009 |
| JP | 2010-105538 | A | 5/2010 |
| JP | 2010-111140 | A | 5/2010 |
| WO | WO 2010097690 | A1 * | 9/2010 |

* cited by examiner

*Primary Examiner* — Jason S Daniels
(74) *Attorney, Agent, or Firm* — Kenyon & Kenyon LLP

(57) ABSTRACT

A load transmission performance of transmitting load efficiently in a vehicle longitudinal direction of a rocker is improved. At a load input portion of a rocker, a sectional surface area, that is orthogonal to the vehicle longitudinal direction, of a rocker outer panel is greater than a sectional surface area, that is orthogonal to the vehicle longitudinal direction, of a rocker inner panel. Accordingly, load is sufficiently distributed and inputted to the rocker outer panel. Accordingly, a bending moment, that bends toward a vehicle transverse direction inner side at the rocker inner panel, is suppressed.

3 Claims, 9 Drawing Sheets

ROCKER END PORTION STRUCTURE

This is a 371 national phase application of PCT/JP2011/070192 filed 5 Sep. 2011, the contents of which are incorporated herein by reference.

TECHNICAL FIELD

The present invention relates to a rocker end portion structure.

BACKGROUND ART

Rockers are disposed, with the vehicle longitudinal direction being the longitudinal direction thereof, at both vehicle transverse direction outer sides of the lower portion of a vehicle. At the time of a front collision of the vehicle, load is transmitted to the vehicle front side end portion of the rocker via the front tire, and the collision load is absorbed.

In Patent Document 1, there is disclosed a side portion vehicle body structure of a vehicle that is structured such that a hinge reinforcement, that reinforces a mounting portion for a lower hinge, is provided in a vicinity of a joined portion of a side sill front portion and a hinge pillar lower portion, and the collision load from a tire is transmitted to the side sill via the hinge reinforcement. (refer to Patent Document 1).

Further, in Patent Document 2, there is disclosed a rocker in which a front-side highly-rigid portion is provided at the upper corner portion of the vehicle transverse direction inner side at the vehicle longitudinal direction front side portion, and a rear-side highly-rigid portion is provided at the lower corner portion of the vehicle transverse direction inner side at the vehicle longitudinal direction rear side portion (refer to Patent Document 2).

Here, at the rocker, at the time of a front collision of the vehicle, and at the time of an offset collision in particular, it is often the case that the front tire hits the vehicle transverse direction inner side of the rocker and load concentrates at the rocker inner panel side. Further, there are cases in which force, by which the vehicle longitudinal direction front side end portion of the rocker inner panel is pulled toward the vehicle transverse direction inner side by the floor panel or the cross member or the like, is applied. Therefore, it is generally the case that changing the material of, or increasing the plate thickness of, or the like of the rocker inner panel is carried out and the yield strength with respect to bending moments is improved, in order for the rocker inner panel to not bend toward the vehicle transverse direction inner side.

However, when the yield strength with respect to bending moments is improved by changing the material of, or increasing the plate thickness of, or the like of the rocker inner panel, this is related to an increase in cost and an increase in weight. Accordingly, efficiently transmitting load in the vehicle longitudinal direction (axial direction) of a rocker is desired.

Patent Document 1: Japanese Patent Application Laid-Open No. 2010-111140

Patent Document 2: Japanese Patent Application Laid-Open No. 2007-203893

Patent Document 3: Japanese Patent Application Laid-Open No. 2010-105538

Patent Document 4: Japanese Patent Application Laid-Open No. 2009-113766

Patent Document 5: Japanese Patent Application Laid-Open No. 2001-138956

DISCLOSURE OF THE INVENTION

Technical Problem

In view of the above-described circumstances, an object of the present invention is to provide a rocker end portion structure that, at the time of a collision, efficiently transmits load in the vehicle longitudinal direction of a rocker.

Solution to Problem

A rocker end portion structure relating to a first aspect comprises: rockers that are provided at both vehicle transverse direction outer sides of a vehicle lower portion, with a longitudinal direction of the rockers being parallel to a vehicle longitudinal direction, and at each of which a rocker outer panel, that is disposed at a vehicle transverse direction outer side, and a rocker inner panel, that is disposed at a vehicle transverse direction inner side, are joined respectively at a vehicle upper side and a vehicle lower side, the rockers being closed cross-sectional structures; and a load input portion that is provided with respect to each rocker at a vehicle front side end portion of the rocker, and that is structured such that a sectional surface area, that is orthogonal to the vehicle longitudinal direction, of the rocker outer panel at a front end portion is larger than a sectional surface area, that is orthogonal to the vehicle longitudinal direction, of the rocker inner panel, and, from the front end portion toward a vehicle rear side, the sectional surface area of the rocker outer panel becomes smaller and the sectional surface area of the rocker inner panel becomes larger.

A rocker end portion structure relating to a second aspect comprises: rockers that are provided at both vehicle transverse direction outer sides of a vehicle lower portion, with a longitudinal direction of the rockers being parallel to a vehicle longitudinal direction, and at each of which a rocker outer panel, that is disposed at a vehicle transverse direction outer side, and a rocker inner panel, that is disposed at a vehicle transverse direction inner side, are joined respectively at a vehicle upper side and a vehicle lower side, the rockers being closed cross-sectional structures; and a load input portion that is provided with respect to each rocker at a vehicle rear side end portion of the rocker, and that is structured such that a sectional surface area, that is orthogonal to the vehicle longitudinal direction, of the rocker outer panel at a rear end portion is larger than a sectional surface area, that is orthogonal to the vehicle longitudinal direction, of the rocker inner panel, and, from the rear end portion toward a vehicle front side, the sectional surface area of the rocker outer panel becomes smaller and the sectional surface area of the rocker inner panel becomes larger.

In accordance with the first aspect or the second aspect, load at the time of a vehicle front collision or at the time of a vehicle rear collision is transmitted and inputted to the load input portion of the end portion of the rocker. At the load input portion, the sectional surface area, that is orthogonal to the vehicle longitudinal direction, of the outer panel is greater than the sectional surface area, that is orthogonal to the vehicle longitudinal direction, of the inner panel, and therefore, load is sufficiently distributed and transmitted to the rocker outer panel side.

Accordingly, a bending moment, in which the rocker inner panel bends toward the vehicle transverse direction inner side, is suppressed, and the load is efficiently transmitted in the vehicle longitudinal direction of the rocker. Accordingly, load is transmitted in both longitudinal directions without the load input portion of the rocker bending toward the vehicle transverse direction inner side, and therefore, the load transmission performance improves.

In a rocker end portion structure relating to a third aspect, a border between the rocker outer panel and the rocker inner panel at the load input portion is, in plan view, inclined toward a vehicle transverse direction outer side while heading in a direction in which the sectional surface area of the rocker outer panel becomes smaller.

In accordance with the third aspect, toward the vehicle rear side, the sectional surface area of the rocker outer panel gradually becomes smaller and the sectional surface area of the rocker inner panel gradually becomes larger. Accordingly, as compared with a structure in which there is a region, at the load input portion, at which the sectional surface area of the rocker outer panel and the sectional surface area of the rocker inner panel suddenly change and stress concentrates, load is efficiently transmitted in the vehicle longitudinal direction of the rocker, and, as a result, the load transmission performance improves more.

In a rocker end portion structure relating to a fourth aspect, a reinforcing member is provided at the rocker along the vehicle longitudinal direction, and a distal end portion of the reinforcing member extends at the load input portion.

In accordance with the fourth aspect, the root portion of the load input portion is the border portion at which the increase/decrease in the sectional surface area of the rocker outer panel and the sectional surface area of the rocker inner panel ends, and therefore, stress concentrates at the root portion, and it is easy for the root portion to become a folding start point. Accordingly, by extending the distal end portion of the reinforcing member at the load input portion, the concentration of stress of the root portion of the load input portion is suppressed. Accordingly, folding of the rocker, whose folding start point is the root portion of the load input portion, is prevented or suppressed.

In a rocker end portion structure relating to a fifth aspect, a distal end of the rocker inner panel projects-out further toward a vehicle longitudinal direction front side or a vehicle longitudinal direction rear side than a distal end of the rocker outer panel.

In accordance with the fifth aspect, the distal end of the rocker inner panel projects-out further than the distal end of the rocker outer panel, and therefore, load is inputted first to the rocker inner panel, and the rocker inner panel deforms in the vehicle longitudinal direction. Then, after the rocker inner panel deforms in the vehicle longitudinal direction and energy is absorbed by an amount corresponding to the projecting margin, load is distributed and inputted to the rocker outer panel and the rocker inner panel respectively. Accordingly, the load transmission performance of the rocker improves.

Advantageous Effects of Invention

In the rocker end portion structure relating to the first aspect or the second aspect, the occurrence of a bending moment, in which the rocker inner panel bends toward the vehicle transverse direction inner side, is suppressed, and load is effectively transmitted in the vehicle longitudinal direction, and therefore, the load transmission performance of the rocker improves.

In the rocker end portion structure relating to the third aspect, as compared with a structure in which there is a region at which the sectional surface area of the rocker outer panel and the sectional surface area of the rocker inner panel suddenly change, load is efficiently transmitted in the vehicle longitudinal direction, and, therefore, the load transmission performance of the rocker improves.

In the rocker end portion structure relating to the fourth aspect, as compared with a structure in which the distal end portion of the reinforcing member does not extend at the load input portion, folding of the rocker, whose folding start point is the root portion of the load input portion, can be prevented or suppressed.

In the rocker end portion structure relating to the fifth aspect, the load transmission performance of the rocker improves as compared with a structure in which the distal end at the vehicle front side of the rocker inner panel does not project-out further than the distal end at the vehicle front side of the rocker outer panel.

BEST MODE FOR CARRYING OUT THE INVENTION

Figure 1:
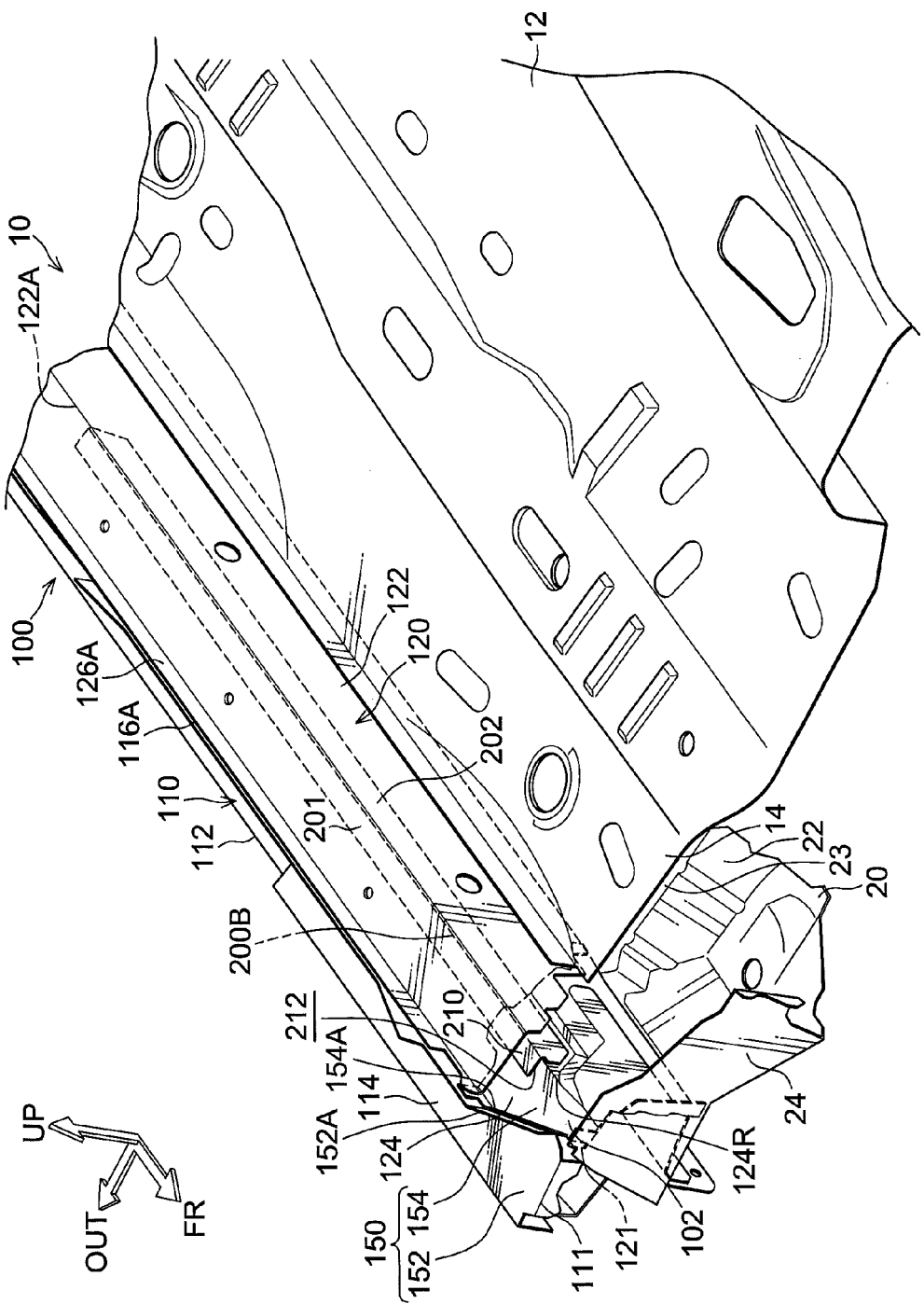
FIG. 1 is a perspective view showing a rocker end portion structure of an embodiment of the present invention.

<Overall Structure>
An embodiment of a rocker end portion structure relating to the present invention is described by using FIG. 1 through FIG. 9. Note that arrow UP in the drawings indicates the vehicle vertical direction upper side, arrow FR indicates the vehicle longitudinal direction front side, and arrow OUT indicates the vehicle transverse direction outer side.

Figure 3:
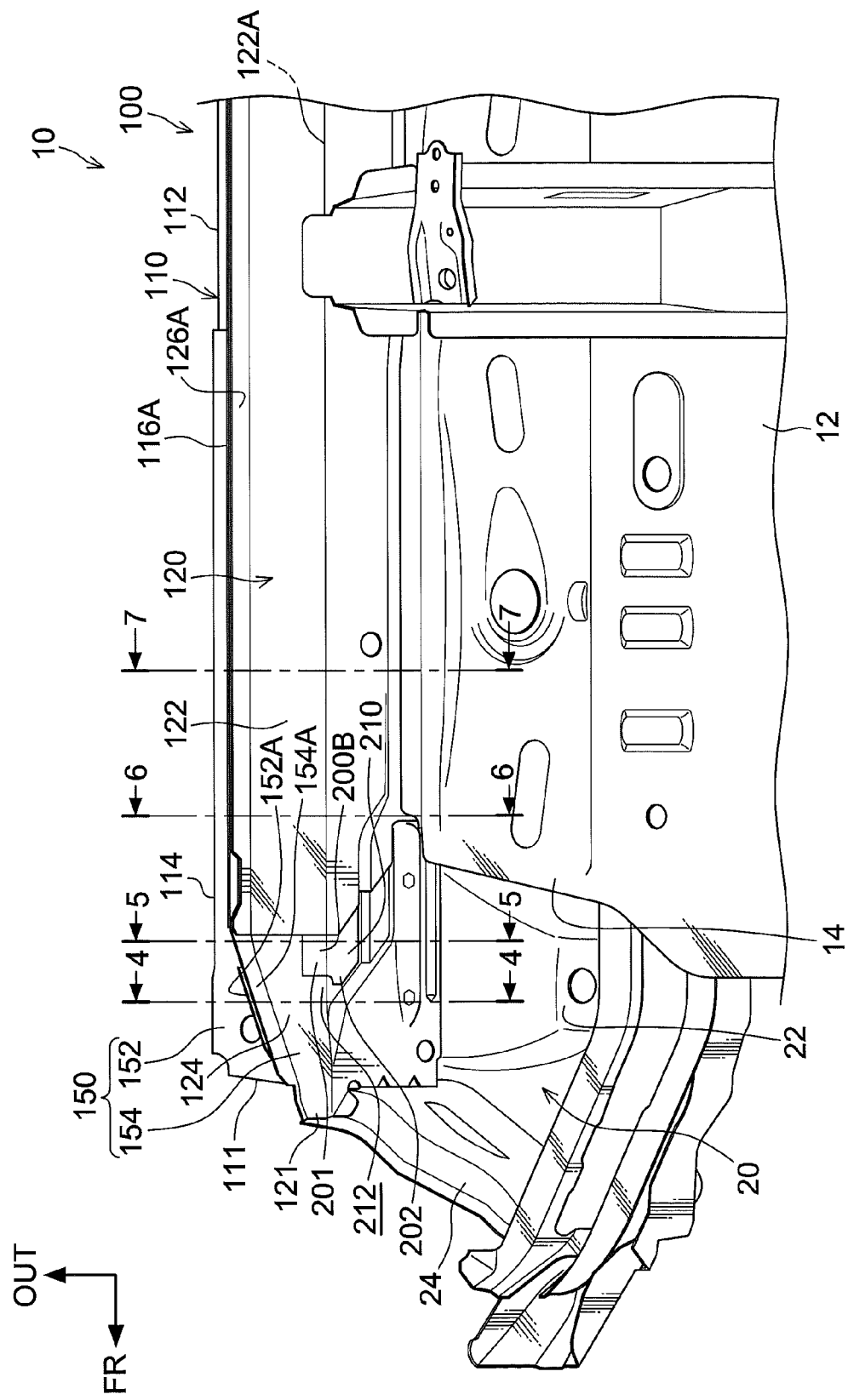
FIG. 3 is a perspective view in which the rocker end portion structure shown in FIG. 1 is viewed from above a vehicle transverse direction inner side, downwardly toward an outer side.

As shown in FIG. 1 and FIG. 3, rockers 100 are disposed substantially horizontally with the vehicle longitudinal direction being the longitudinal direction thereof, at both vehicle transverse direction outer sides of the vehicle lower portion of a vehicle 10. The vehicle transverse direction inner sides of the rockers 100 are joined to both vehicle transverse direction outer sides of a floor panel 12 that structures the floor portion of the vehicle lower portion.

As shown in FIG. 2 and FIG. 4 through FIG. 7, the rocker 100 has a rocker outer panel 110 that is hat-shaped in cross-section and structures the vehicle body transverse direction outer side, and a rocker inner panel 120 that is hat-shaped in cross-section and structures the vehicle body transverse direction inner side. Further, as shown in FIG. 4 through FIG. 7, the rocker 100 of a closed cross-sectional structure is structured by setting, face-to-face, the opening sides of the rocker outer panel 110 and the rocker inner panel 120, and a flange portion 116A and a flange portion 126A at the upper side being joined, and further, a flange portion 116B and a flange portion 126B at the lower side being joined.

Figure 2:
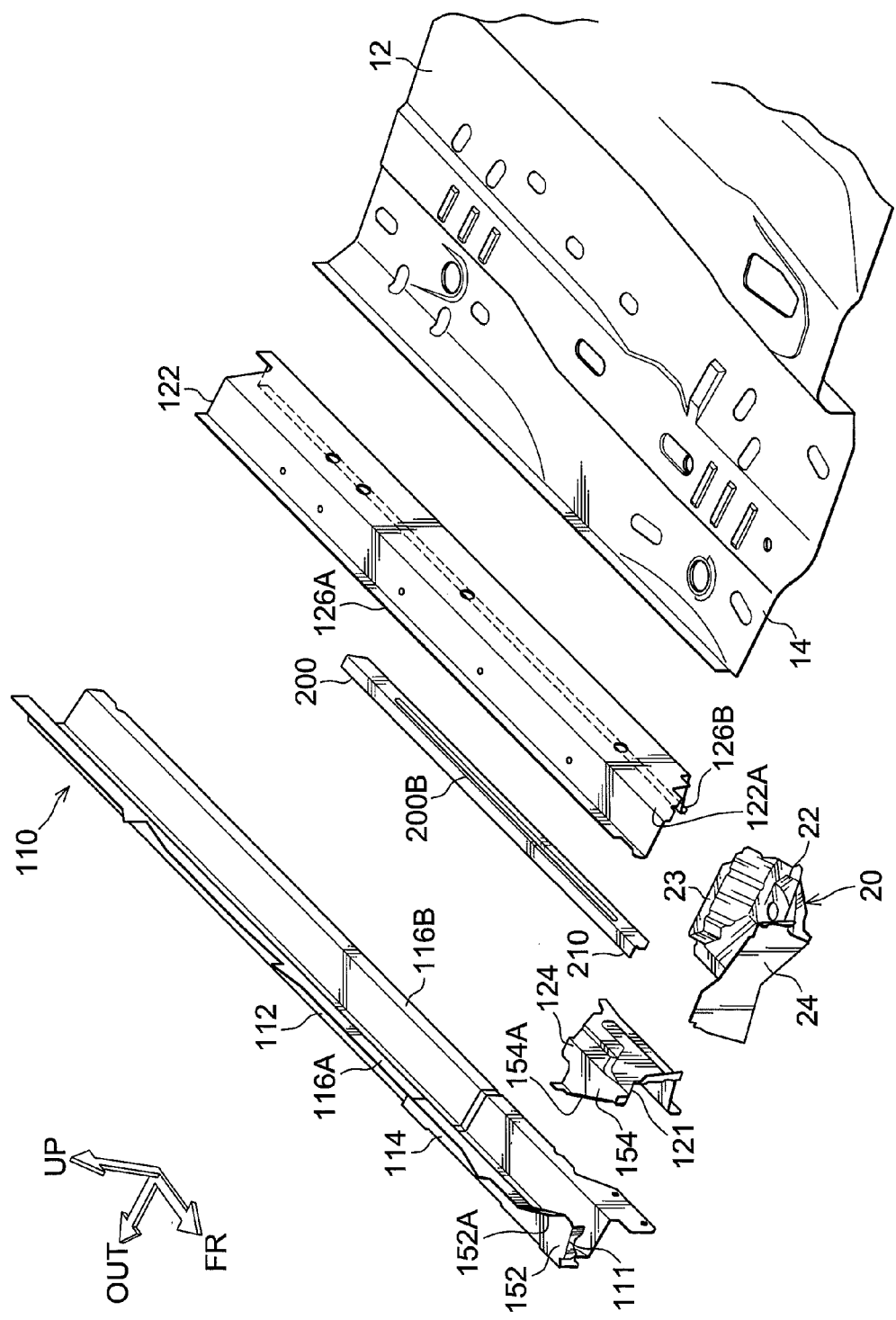
FIG. 2 is an exploded perspective view of the rocker end portion structure shown in FIG. 1.

As shown in FIG. 1 through FIG. 3, the rocker outer panel 110 is structured by a rocker outer front 114, that structures a vehicle longitudinal direction front side portion, being joined to a rocker outer main body 112. Further, the rocker inner panel 120 is structured by a rocker inner front 124, that structures the vehicle longitudinal direction front side portion, being joined to a rocker inner main body 122. Note that, in the present embodiment, the rocker outer front 114 is made to have lower rigidity than the rocker outer main body 112, and the rocker inner front 124 is made to have lower rigidity than the rocker inner main body 122.

As shown in FIG. 1 and FIG. 2, the rocker outer front 114 is joined to the outer surface side of the vehicle transverse direction outer side of the rocker outer main body 112. On the other hand, the rocker inner front 124 is joined to the inner surface side of the vehicle transverse direction outer side of the rocker inner main body 122. Further, a distal end 121 of the vehicle longitudinal direction front side of the rocker inner panel 120 (the rocker inner front 124) projects-out further toward the vehicle front side than a distal end 111 of the vehicle longitudinal direction front side of the rocker outer panel 110 (the rocker outer front 114) (refer to FIG. 9 as well).

As shown in FIG. 1 through FIG. 3, a torque box 20 is joined to the vehicle transverse direction outer side front end portion of the floor panel 12 and to the vehicle longitudinal direction front end portion of the rocker 100. The torque box 20 has a concave portion 22 that is disposed with the vehicle vertical direction upper side thereof being the opening side, and a wall portion 24 that is provided at the vehicle longitudinal direction front side of the concave portion 22. Further, a flange portion 23 of an upper end of the concave portion 22 of the torque box 20 is joined to the lower surface of the floor panel 12 and to the rocker 100, and the vehicle transverse direction outer side portion of the wall portion 24 is joined to the distal end 121 of the rocker inner panel 120 (the rocker inner front 124).

As shown in FIG. 1 through FIG. 3 and FIG. 9, a flange portion 152A (the front end portion of the flange portion 116A at the upper side of the rocker outer panel 110) of a top surface portion 152 of the rocker outer front 114, and a flange portion 154A (the front end portion of the flange portion 126A at the upper side of the rocker inner panel 120) of a top surface portion 154 of the rocker inner front 124, are, in plan view, inclined toward the vehicle transverse direction inner side while heading toward the vehicle longitudinal direction front side.

Due thereto, the front end portion in the vehicle longitudinal direction of the rocker 100 is structured such that sectional surface area S1 (refer to FIG. 4), that is orthogonal to the vehicle longitudinal direction, of the rocker outer panel 110 (the rocker outer front 114) is greater than sectional surface area S2 (refer to FIG. 4), that is orthogonal to the vehicle longitudinal direction, of the rocker inner panel 120 (the rocker inner front 124). Further, as shown in FIG. 4 through FIG. 7, toward the vehicle longitudinal direction rear side, the sectional surface area S1 of the rocker outer panel 110 (the rocker outer front 114) gradually becomes smaller and the sectional surface area S2 (refer to FIG. 4) of the rocker inner panel 120 (the rocker inner front 124) gradually becomes larger.

Figure 9:
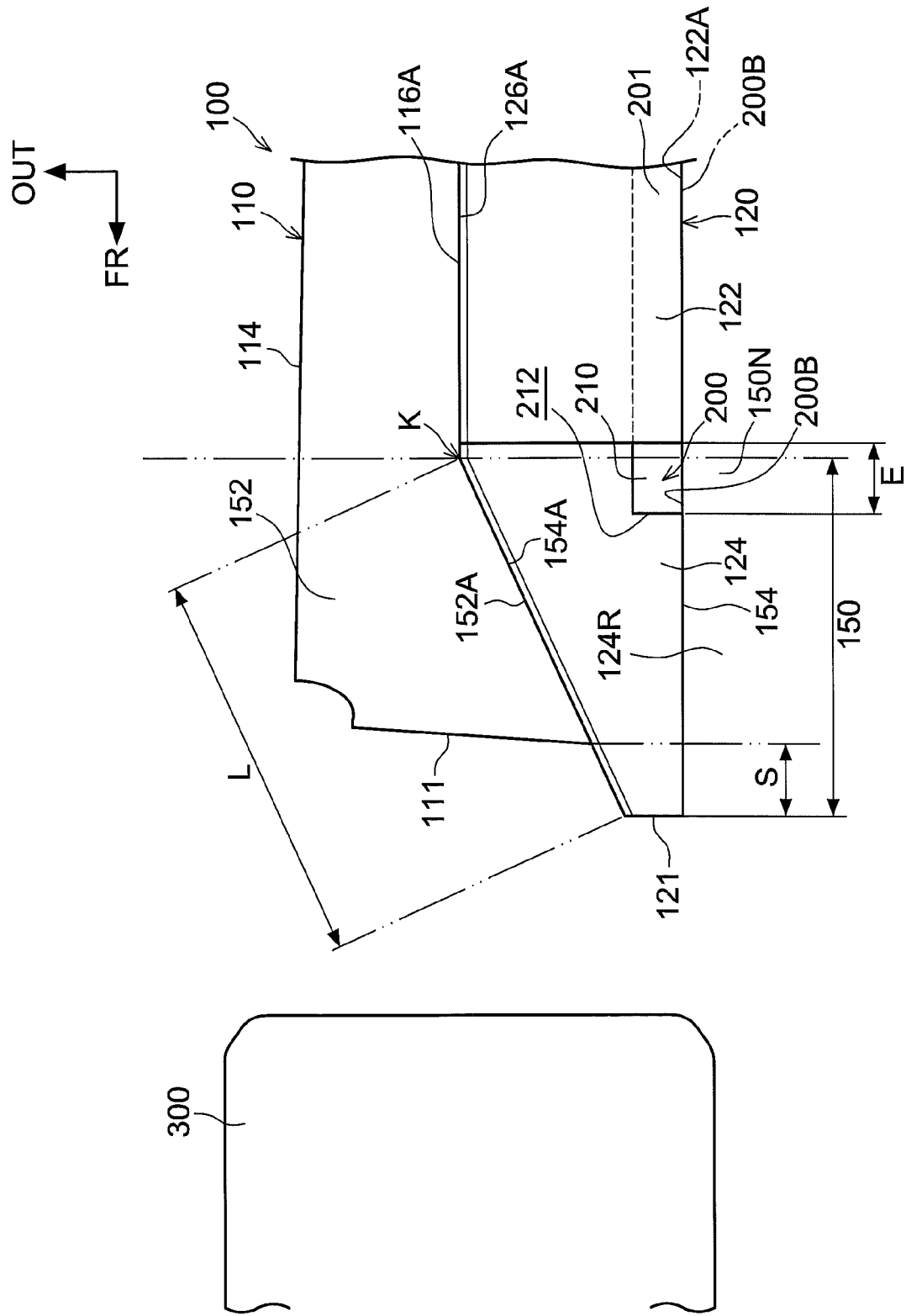
FIG. 9 is a plan view schematically showing the rocker end portion structure shown in FIG. 1.

Note that, as shown in FIG. 9, the portion at which the flange portion 152A of the rocker outer front 114 and the flange portion 154A of the rocker inner front 124 are inclined is a load input portion 150. In other words, from the vehicle longitudinal direction front end of the rocker 100 (in the present embodiment, the distal end 121 of the vehicle longitudinal direction front side of the rocker inner panel 120 (the rocker inner front 124)) to a region (root portion 150N) where the changes in the sectional surface area S1 of the rocker outer panel 110 (the rocker outer front 114) and the sectional surface area S2 of the rocker inner panel 120 (the rocker inner front 124) end, is the load input portion 150.

Further, as shown in FIG. 2 and FIG. 4 through FIG. 7, the portion, at the rocker 100, the portion that is further toward the vehicle longitudinal direction rear side than the root portion 150N of the load input portion 150 is structured such that the sectional surface area S1 of the rocker outer panel 110 and the sectional surface area S2 of the rocker inner panel 120 are substantially uniform.

As shown in FIG. 1 through FIG. 3 and FIG. 6 and FIG. 7, a reinforcing member 200 is provided along the vehicle longitudinal direction at the rocker 100. The reinforcing member 200 is structured from a top surface portion 201 and a side surface portion 202, and the cross-sectional shape thereof orthogonal to the vehicle longitudinal direction is substantially L-shaped. Further, a corner portion 200A of the reinforcing member 200 hits and is joined to an upper corner portion 122A at the inner side of the rocker inner main body 122 that structures the rocker inner panel 120. Moreover, a distal end portion 210 of the reinforcing member 200 projects-out toward the vehicle longitudinal direction front side from the rocker inner main body 122 (refer to FIG. 8 and FIG. 9 as well).

Figure 5:
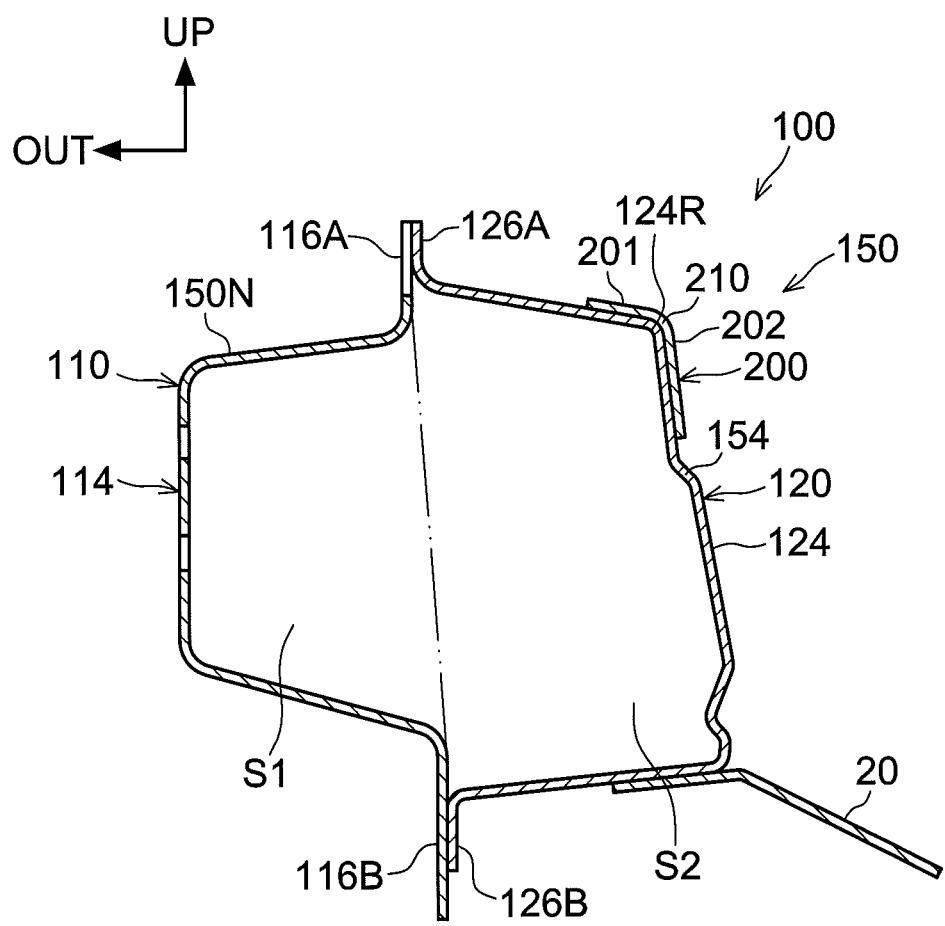
FIG. 5 is a cross-sectional view, along line 5-5, of the rocker end portion structure shown in FIG. 3.
Figure 6:
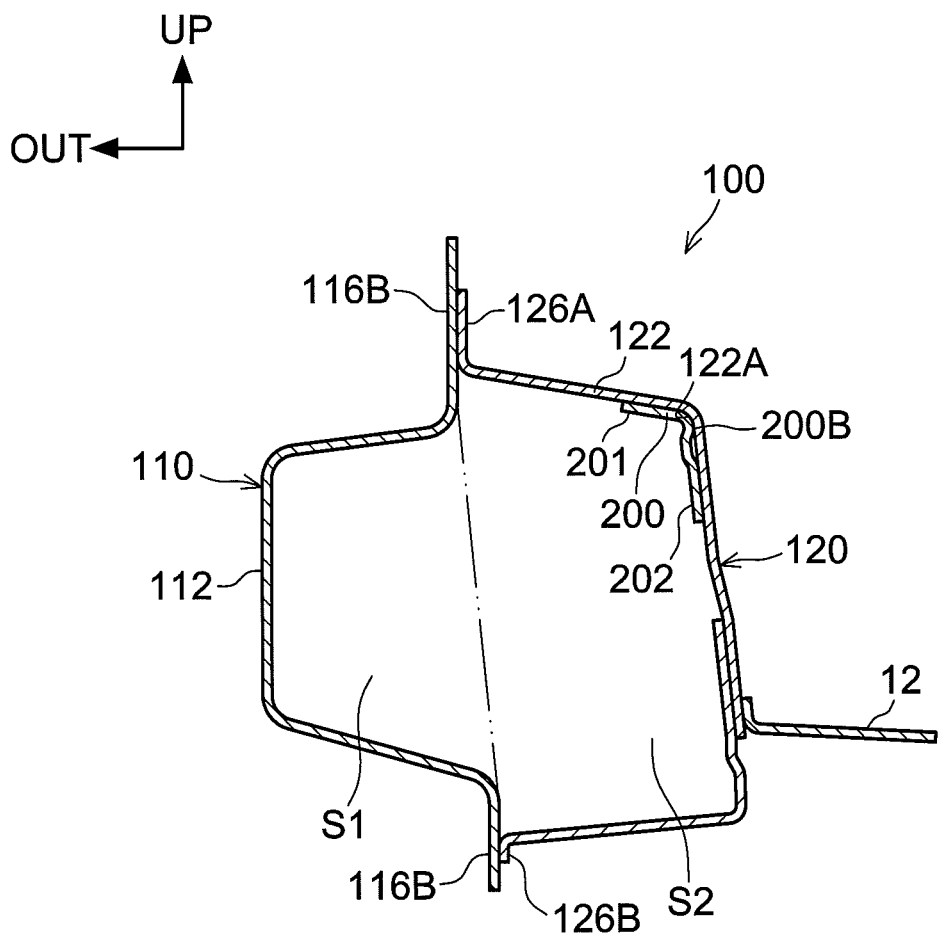
FIG. 6 is a cross-sectional view, along line 6-6, of the rocker end portion structure shown in FIG. 3.
Figure 7:
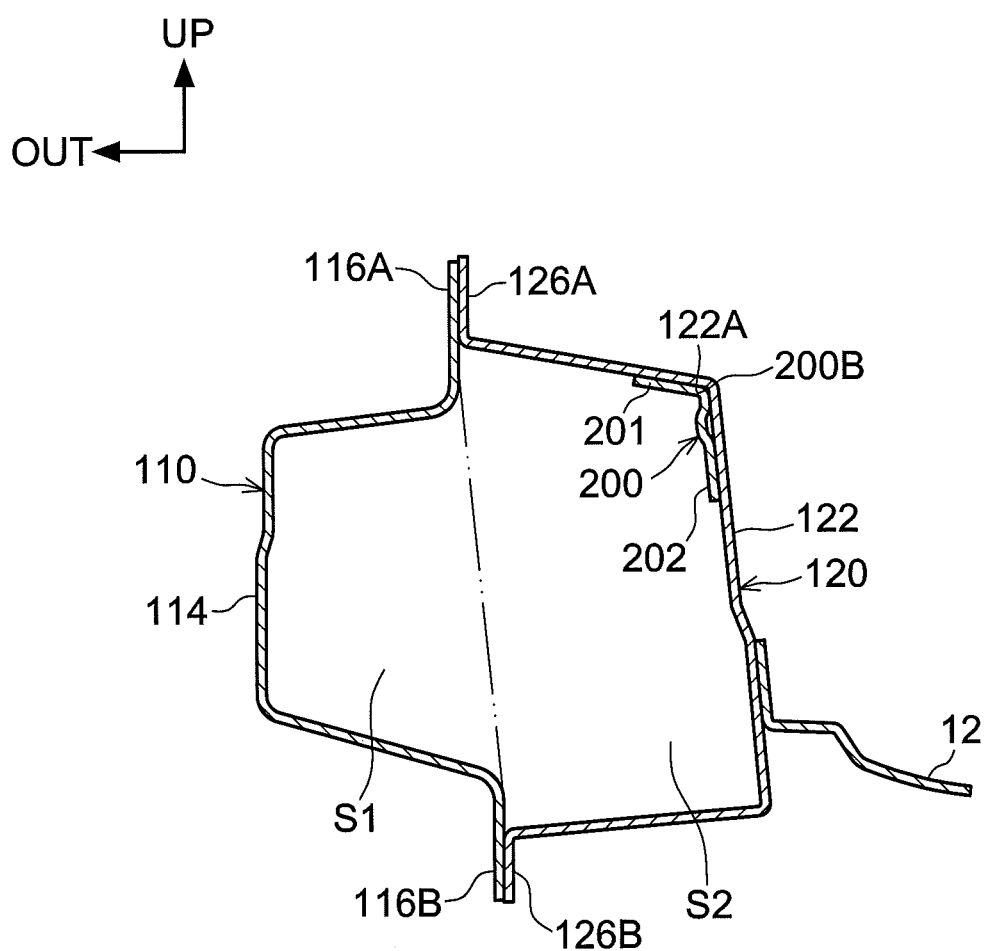
FIG. 7 is a cross-sectional view, along line 7-7, of the rocker end portion structure shown in FIG. 3.
Figure 8:
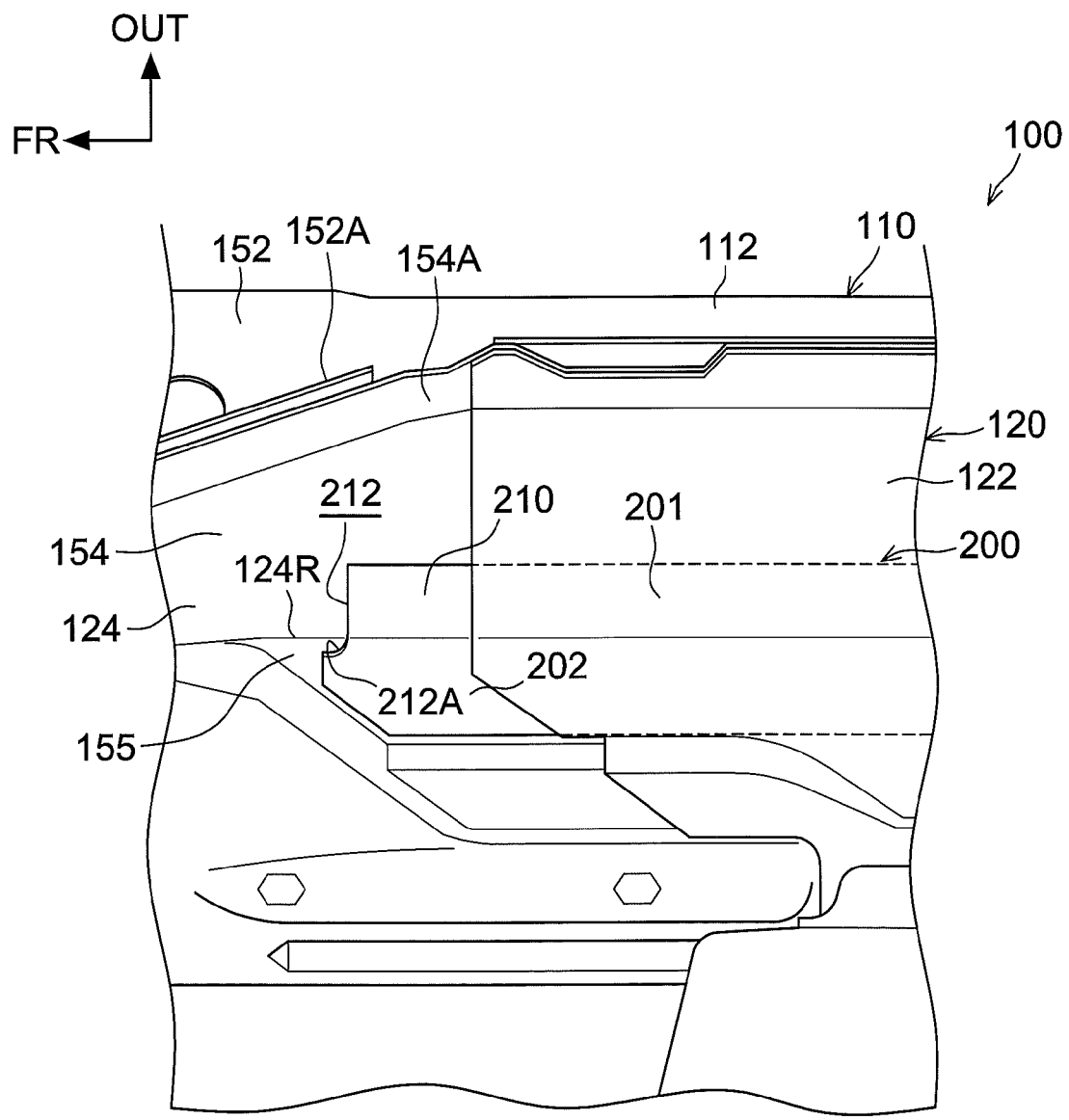
FIG. 8 is a perspective view in which main portions of the rocker end portion structure shown in FIG. 3 are enlarged.

As shown in FIG. 1, FIG. 3 and FIG. 8, the rocker inner front 124 is joined to the inner surface side of the rocker inner main body 122 to which the reinforcing member 200 is joined. Accordingly, as shown in FIG. 5, the distal end portion 210, that projects-out from the rocker inner main body 122, of the reinforcing member 200 is disposed and joined along the outer side of a ridge line (upper corner portion) 124R of the rocker inner front 124.

Further, as shown in FIG. 8, a cut-out portion 212, whose vehicle transverse direction outer side is cut-out in an L-shape, is formed in the front end portion of the distal end portion 210 of the reinforcing member 200. The cut-out portion 212 is cut-out so as to extend over the ridge line 124R of the rocker inner front 124, and an end portion 212A at the vehicle transverse direction outer side is positioned at the side surface portion 202 of the reinforcing member 200.

<Operation and Effects>

Operation and effects of the present embodiment are described next.

As shown in FIG. 9, at the time of a front collision of the vehicle 10, load is successively transmitted from a front body portion such as the front bumper or the like, and is inputted to a front tire 300. Further, due to the front tire 300 withdrawing and abutting the load input portion 150 that structures the front end portion of the rocker 100, load is transmitted and inputted to the load input portion 150 of the rocker 100 via the front tire 300.

At the front end portion of the load input portion 150 of the rocker 100, the sectional surface area S1 (refer to FIG. 4), that is orthogonal to the vehicle longitudinal direction, of the rocker outer panel 110 (the rocker outer front 114) is greater than the sectional surface area S2 (refer to FIG. 4), that is orthogonal to the vehicle longitudinal direction, of the rocker inner panel 120 (the rocker inner front 124). Accordingly, the load is sufficiently distributed and inputted to the rocker outer panel 110. Accordingly, a bending moment, in which the rocker inner panel 120 bends toward the vehicle transverse direction inner side, is suppressed.

Figure 4:
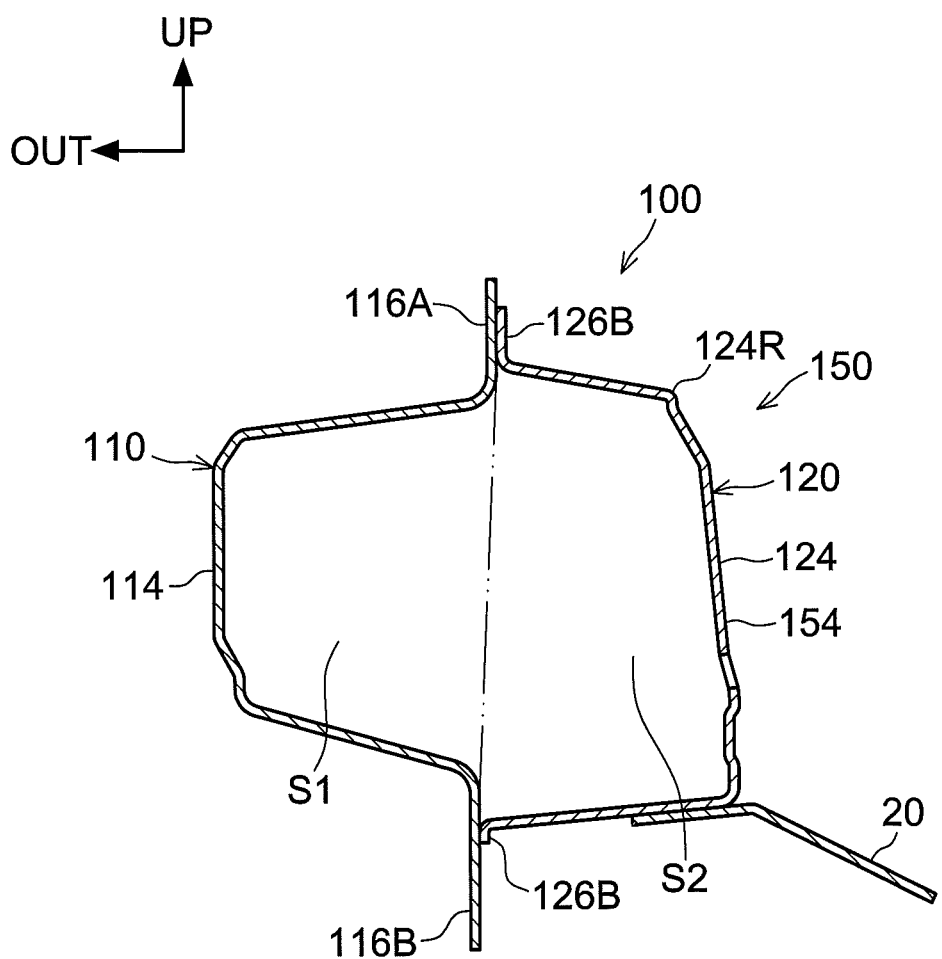
FIG. 4 is a cross-sectional view, along line 4-4, of the rocker end portion structure shown in FIG. 3.

Further, at the load input portion 150, toward the vehicle rear side, the sectional surface area S1 of the rocker outer panel 110 (the rocker outer front 114) becomes smaller, and the sectional surface area S2 of the rocker inner panel 120 (the rocker inner front 124) becomes larger (refer to FIG. 4 and FIG. 5). Accordingly, as the load input portion 150 is crushed in the vehicle longitudinal direction (the axial direction), the load that is distributed and inputted to the rocker outer panel 110 gradually becomes smaller, and the load that is distributed and inputted to the rocker inner panel 120 gradually becomes larger.

In this way, a bending moment in which the rocker inner panel 120 bends toward the vehicle transverse direction inner side is suppressed, and load is efficiently transmitted in the vehicle longitudinal direction (the axial direction) of the rocker 100. Accordingly, the load transmission performance of transmitting load in the vehicle longitudinal direction (the axial direction) of the rocker 100 improves.

Note that energy is absorbed due to the load input portion 150 of the rocker 100 being crushed in the vehicle longitudinal direction (the axial direction) without bending toward the vehicle transverse direction inner side. Further, in the present embodiment, the rocker outer front 114 and the rocker inner front 124, that structure the load input portion 150 at the vehicle front side end portion of the rocker 100, are less rigid than the rocker outer main body 112 and the rocker inner main body 122, respectively. Accordingly, with certainty, only the load input portion 150 is crushed and energy is absorbed, and the rocker 100 transmits the load in the vehicle longitudinal direction (the axial direction).

Moreover, in plan view, the flange portion 152A of the rocker outer panel 110 (the rocker outer front 114) of the load input portion 150, and the flange portion 154A of the rocker inner panel 120 (the rocker inner front 124), are inclined toward the vehicle transverse direction inner side while heading toward the vehicle longitudinal direction front side. Namely, toward the vehicle longitudinal direction rear side, the sectional surface area S1 of the rocker outer panel 110 (the rocker outer front 114) gradually becomes smaller and the sectional surface area S2 (refer to FIG. 4) of the rocker inner panel 120 (the rocker inner front 124) gradually becomes larger. Accordingly, as compared with a structure in which there is a region at which the sectional surface area S1 of the rocker inner panel 120 and the sectional surface area S2 of the rocker outer panel 110 suddenly change and stress concentrates and that becomes a folding start point, load is more reliably transmitted in the vehicle longitudinal direction of the rocker 100 (the load input portion 150), and, as a result, the load transmission performance improves more.

Further, the distal end 121 at the vehicle longitudinal direction front side of the rocker inner panel 120 (the rocker inner front 124) projects-out further toward the vehicle front side than the distal end 111 at the vehicle longitudinal direction front side of the rocker outer panel 110 (the rocker outer front 114). Accordingly, load is inputted first to the rocker inner panel 120, and the rocker inner panel 120 at the load input portion 150 deforms and is crushed in the vehicle longitudinal direction. Then, after the rocker inner panel 120 deforms and is crushed in the vehicle longitudinal direction and energy is absorbed by an amount corresponding to a projecting margin S (refer to FIG. 9), load is distributed and inputted to the rocker outer panel 110 and the rocker inner panel 120 respectively. Accordingly, the load transmission performance of the rocker 100 improves more.

Moreover, the root portion 150N of the load input portion 150 is the border portion at which the decrease in the sectional surface area S1 and the increase in the sectional surface area S2 end, and therefore, it is easy for stress to concentrate thereat and for the root portion 150N to become the folding start point. Accordingly, by making the distal end portion 210 of the reinforcing member 200 project-out toward the vehicle longitudinal direction front side from the rocker inner main body 122, the concentration of stress of the root portion 150N of the load input portion 150 is suppressed. Accordingly, folding, whose folding start point is the root portion 150N, is prevented or suppressed.

Further, the distal end portion 210 of the reinforcing member 200 is disposed at the vehicle transverse direction inner side (the outer surface side) of the rocker inner front 124. Due to such an arrangement, the distal end portion 210 is a structure that effectively suppresses bending in which the rocker inner front 124 is folded toward the vehicle transverse direction inner side. Moreover, it is easy to provide a difference in strengths in order to cause stress to concentrate at the rocker inner front 124. Accordingly, as compared with a structure in which the distal end portion 210 is disposed at the vehicle transverse direction outer side (inner surface side) of the rocker inner front 124, folding of the rocker inner front 124 toward the vehicle transverse direction inner side is effectively suppressed.

Moreover, the cut-out portion 212 is formed in the distal end of the distal end portion 210 of the reinforcing member 200. Further, the cut-out portion 212 is cut-out so as to extend over the ridge line 124R of the rocker inner panel 120. Accordingly, even if stress concentrates at the cut-out portion 212, so-called inward folding, in which the ridge line 124R of the rocker inner panel 120 is folded toward the vehicle transverse direction inner side, is prevented, and the ridge line 124R is crushed in the vehicle longitudinal direction.

Here, as shown in FIG. 9, when supposing that a moment M=L×F, that bends toward the vehicle transverse direction inner side with point K of the rear end of the vehicle transverse direction outer side being the start point, arises at the rocker outer panel 110 (the rocker outer front 114) to which load F is inputted, folding, whose start point is point K of the rocker outer panel 110 (the rocker outer front 114), is prevented due to a reaction moment, that becomes reaction for opposing this moment M, being in equilibrium. Further, length E in the vehicle longitudinal direction of the distal end portion 210 is set so as to be sufficient for the distal end portion 210 of the reinforcing member 200 to generate the reaction moment.

<Other Points>

Note that the present invention is not limited to the above-described embodiment.

For example, in the above-described embodiment, the reinforcing member 200 is substantially L-shaped in cross-section and is provided at the rocker inner panel 120 side, but the reinforcing member 200 is not limited to this. The reinforcing member 200 may be a shape that is other than substantially L-shaped in cross-section. Further, the reinforcing member 200 may be provided at the rocker outer panel 110 side. Moreover, the reinforcing member 200 may be a structure that does not have the distal end portion 210 that projects-out at the load input portion 150.

Further, the above embodiment describes an end portion structure of the vehicle front side end portion of the rocker 100 to which load is transmitted via a front tire at the time of a front collision of the vehicle, but it not limited to this. The present invention can be applied as well to an end portion structure of the vehicle rear side end portion of a rocker to which load is transmitted via a rear tire at the time of a rear collision of the vehicle. Note that the structure in a case in which the present invention is applied also to the end portion structure of the vehicle rear side end portion of the rocker is substantially similar to a structure in which the vehicle longitudinal direction is reversed in the above-described embodiment.

Moreover, it goes without saying that the present invention can be implemented in various forms within a range that does not deviate from the gist of the present invention.

The invention claimed is:

1. A rocker end portion structure comprising:

rockers that are provided at both vehicle transverse direction outer sides of a vehicle lower portion, with a longitudinal direction of the rockers being parallel to a vehicle longitudinal direction, and at each of which a rocker outer panel, that is disposed at a vehicle transverse direction outer side, and a rocker inner panel, that is disposed at a vehicle transverse direction inner side, are joined respectively at a vehicle upper side and a vehicle lower side, the rockers being closed cross-sectional structures; and a load input portion that is provided with respect to each rocker at a vehicle front side end portion of the rocker, and that is structured such that a sectional surface area, that is orthogonal to the vehicle longitudinal direction, of the rocker outer panel at a front end portion is larger than a sectional surface area, that is orthogonal to the vehicle longitudinal direction, of the rocker inner panel, and, from the front end portion toward a vehicle rear side, the sectional surface area of the rocker outer panel becomes smaller and the sectional surface area of the rocker inner panel becomes larger, a border between the rocker outer panel and the rocker inner panel at the load input portion being, in plan view, inclined toward the vehicle transverse direction outer side while heading in a direction in which the sectional surface area of the rocker outer panel becomes smaller, wherein a distal end of the rocker inner panel projects-out further toward a vehicle longitudinal direction front side than a distal end of the rocker outer panel, wherein the distal end of the rocker outer panel is joined at a portion of the inclined border between the rocker outer panel and the rocker inner panel.

2. The rocker end portion structure of claim 1, wherein a reinforcing member is provided at the rocker along the vehicle longitudinal direction, and a distal end portion of the reinforcing member extends at the load input portion.

3. A rocker end portion structure comprising:

rockers that are provided at both vehicle transverse direction outer sides of a vehicle lower portion, with a longitudinal direction of the rockers being parallel to a vehicle longitudinal direction, and at each of which a rocker outer panel, that is disposed at a vehicle transverse direction outer side, and a rocker inner panel, that is disposed at a vehicle transverse direction inner side, are joined respectively at a vehicle upper side and a vehicle lower side, the rockers being closed cross-sectional structures; and a load input portion that is provided with respect to each rocker at a vehicle rear side end portion of the rocker, and that is structured such that a sectional surface area, that is orthogonal to the vehicle longitudinal direction, of the rocker outer panel at a rear end portion is larger than a sectional surface area, that is orthogonal to the vehicle longitudinal direction, of the rocker inner panel, and, from the rear end portion toward a vehicle front side, the sectional surface area of the rocker outer panel becomes smaller and the sectional surface area of the rocker inner panel becomes larger, a border between the rocker outer panel and the rocker inner panel at the load input portion being, in plan view, inclined toward the vehicle transverse direction outer side while heading in a direction in which the sectional surface area of the rocker outer panel becomes smaller, wherein a distal end of the rocker inner panel projects-out further toward a vehicle longitudinal direction rear side than a distal end of the rocker outer panel, wherein the distal end of the rocker outer panel is joined at a portion of the inclined border between the rocker outer panel and the rocker inner panel.

* * * * *